United States Patent [19]

Yamashita et al.

[11] 4,149,077
[45] Apr. 10, 1979

[54] METHOD FOR SEPARATION AND ENRICHMENT OF LITHIUM ISOTOPES BY LASER

[75] Inventors: Mikio Yamashita, Tanashi; Hiroshi Kashiwagi, Akishima, both of Japan

[73] Assignee: Agency of Industrial Science & Technology, Ministry of International Trade & Industry, Tokyo, Japan

[21] Appl. No.: 827,255

[22] Filed: Aug. 24, 1977

[30] Foreign Application Priority Data

Aug. 27, 1976 [JP] Japan .................. 51/101626

[51] Int. Cl.² ............... B01J 1/10; H01J 27/00
[52] U.S. Cl. ................ 250/423 P; 176/1; 204/157.1 R; 204/DIG. 11; 250/282
[58] Field of Search .......... 250/423 P, 281, 282; 55/2; 204/DIG. 11, 157.1 R; 176/1

[56] References Cited

U.S. PATENT DOCUMENTS 3,951,768  4/1976  Gürs ................. 204/DIG. 11

*Primary Examiner*—Alfred E. Smith
*Assistant Examiner*—B. C. Anderson
*Attorney, Agent, or Firm*—Oblon, Fisher, Spivak, McClelland & Maier

[57] ABSTRACT

The element "lithium" has strong absorption lines near 6707.84 Å and 3232.61 Å and possesses specific isotope shifts at the respective absorption lines. With the aid of a laser capable of controlling the oscillation spectral width accurately to 0.01 Å, the isotopes of this element are separated from each other by irradiating lithium atomic beam with a laser beam tuned to the absorption line of either of the isotopes, $^6$Li and $^7$Li, for thereby selectively exciting the isotope, ionizing the excited isotope along by irradiation with a laser beam having one photon energy enough to pump it from the excited state to the ionized state and separating the ionized isotope from the un-ionized isotope by means of a mass-filter.

7 Claims, 5 Drawing Figures

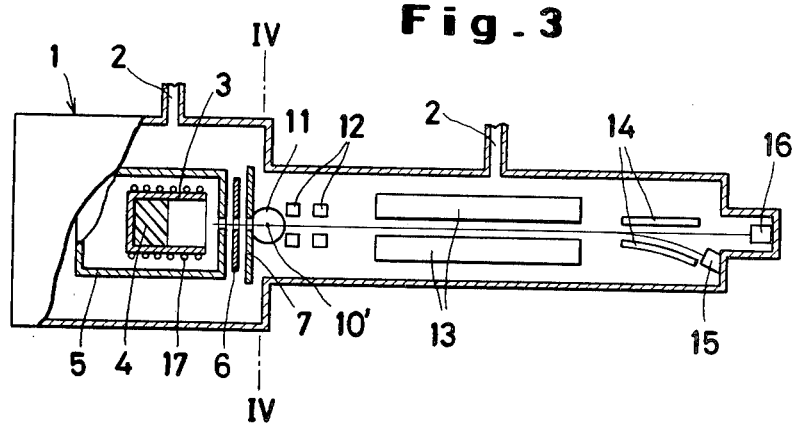
Fig_3
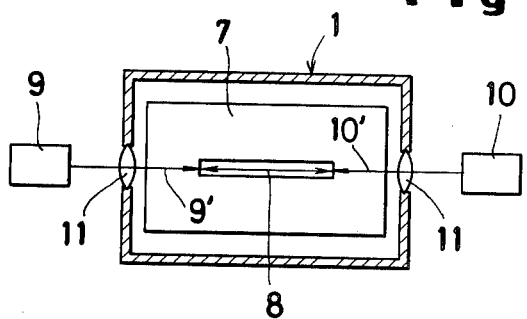
Fig_4
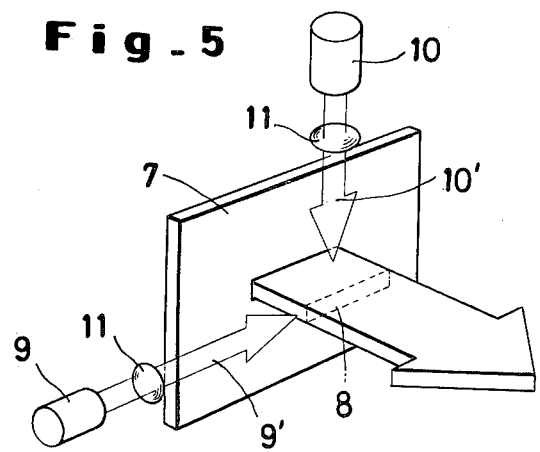
Fig_5

METHOD FOR SEPARATION AND ENRICHMENT OF LITHIUM ISOTOPES BY LASER

BACKGROUND OF THE INVENTION

This invention relates to a method for the enrichment or separation of lithium isotopes, $^6Li$ and $^7Li$, by means of a laser.

In nature, the lithium isotopes, $^6Li$ and $^7Li$, exist at a proportion of 7.42:92.58.

Recently, $^6Li$ has come to arrest increasing attention as the source for tritium, T, which is used as the fuel for thermonuclear fusion furnaces. In other words, the importance of tritium T as the fuel for thermonuclear fusion furnaces has come to be recognized in consequence of the growth of researches on thermonuclear fusion furnaces. On the earth, tritium T is extremely rare and exists in a proportion of only $1/10^{18}$ to 1 with respect to ordinary hydrogen (protium). In view of such extremely meager natural presence of tritium, it is readily appreciated that the isotope must be artificially manufactured by some method or other in order for the isotope to be used as a fuel on a commercial scale. One of the simplest methods so far available is by a nuclear reaction of the following formula which is caused by irradiation of $^6Li$ with thermo-neutrons. This nuclear reaction permits ready production of tritium T.

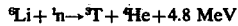

Also, tritium T can be produced from $^7Li$ by a reaction of the following formula. In this case, the reaction does not occur unless the neutrons to be used have a sufficiently high energy level. For this reason, $^7Li$ is mainly used as the absorbent for neutrons in nuclear fission furnaces.

To be more specific, $^6Li$ is used as the source for the initial charge of tritium in thermonuclear fusion furnaces or as the breeder for tritium within the blankets of such furnaces. In contrast, $^7Li$ concentrated to more than 99% is used as the absorbent for neutrons and as the pH adjuster for preventing hydrogen embrittlement in nuclear fission light-water furnaces. In a nuclear fission power generation furnace having a capacity of 550,000 KW, for example, about 70 Kg of $^7Li$ is consumed for this purpose per year.

As described above, the technique adopted for the enrichment or separation of the isotopes of lithium, $^6Li$ and $^7Li$, is vitally important for nuclear fusion furnaces and for nuclear fission furnaces.

To date, almost all attempt to enrich and separate $^6Li$ have relied on by exchange reaction methods, followed by electrolysis methods, molecular distillation methods and ionic migration methods. All these methods make use of differences in reaction velocity or particle velocity due to the mass difference between the two isotopes.

The two-phase exchange reaction method which effects the enrichment by utilizing the phenomenon that the rates of penetration into two phases depend on the mass difference between the isotopes, necessitates use of a combination of two liquid phases which involve a large isotope separation factor. For example, in the Journal of Chemical Physics, Vol. 56, No. 5, pp 1855-1862 (1972), the combination of an organic solvent and a dielectric solvent is suggested. In the Journal of Chemical Physics, Vol. 57, No. 12, pp 5556-5561 (1972), the combination of an aqueous solution and an organic solvent is suggested. The combination of an aqueous solution and an amalgam is suggested in the Journal of Chemical Physics, Vol. 64, No. 4, pp 1828-1837. An ionic migration method which accomplishes the enrichment of lithium isotopes by utilizing the mobility of ions affected by the difference of masses of the lithium isotopes in a DC-applied solution passed therethrough has also been suggested [The Journal of Physical Chemistry, Vol. 62, 760 (1958)].

These methods invariably utilize the small mass difference only from the inertial point of view and, therefore, involve extremely small isotope separation factors. This means that acquisition of a desired isotope of lithium in a required quantity makes it necessary to perform the enrichment and separation process in a multiplicity of steps repeatedly for a long period of time. The ionic migration method consumes electric power in a quantity too large to make the operation thereof commercially feasible.

In the Japanese Patent Public Disclosure No. 13798/1968, there is disclosed a method whereby the isotopes of uranium are separated by irradiating uranium with a laser beam in two separate stages so as to excite and ionize the desired isotope. This method cannot be applied to the enrichment and separation of the isotopes of lithium, however, because uranium and lithium have entirely different spectrum structures and pressure characteristic and, accordingly, different shifts of absorption lines and different wavelengths, which are controlled by a entirely different method, of laser beams to be used.

SUMMARY OF THE INVENTION

An object of the present invention is to provide a method for easily and economically separating and enriching the isotopes of lithium, $^6Li$ and $^7Li$.

The method of this invention which thus aims to separate and enrich the isotopes of lithium first causes lithium atomic beam to be irradiated with a first laser beam of a wavelength capable of exciting the first isotope of lithium and incapable of exciting the second isotope of lithium. For example, the irradiation of lithium vapor with a laser beam of a wavelength of 6707.761 Å or about 3232.61 Å causes selective excitation of $^6Li$, whereas the irradiation using a laser beam of a wavelength of 6708.072 Å or about 3232.60 Å results in selective excitation of $^7Li$. Then, the lithium beam which has undergone the irradiation with the first laser beam is simultaneously irradiated with a second laser beam of a wavelength capable of ionizing the excited lithium isotope and incapable of ionizing the unexcited lithium isotope, so as to ionize only the lithium isotope in the excited state. To be more concrete, the selective ionization of the excited isotope of lithium is obtained by irradiating the lithium beam with a laser beam of a wavelength of less than 3500 Å where the excitation has been effected by use of a wavelength in the neighborhood of 6708 Å or with a laser beam of a wavelength of less than 800 Å where the excitation has been effected by use of a wavelength in the neighborhood of 3233 Å. The isotope of lithium which has thus been ionized and the other isotope of lithium which has escaped being ionized are separated from each other by means of a mass-filter.

According to the method of this invention, the separation and enrichment of isotopes of lithium are accomplished by selectively exciting and ionizing a desired one of the isotopes owing to the isotope shifts in the absorption lines of lithium as described above. Therefore, the separation and enrichment of isotopes of lithium can be carried out easily and effectively in a short period of time.

The other objects and the other characteristic features of the present invention will become apparent from the detailed description to be given herein below with reference to the accompanying drawings.

BRIEF EXPLANATION OF THE DRAWINGS

FIG. 3 is a schematic sectioned plan view of one embodiment of the device to be used in practising the method of separation and enrichment of the isotope of lithium according to this invention.

FIG. 4 is a sectioned view taken along the line IV—IV in FIG. 3.

FIG. 5 is an explanatory diagram illustrating the directions of irradiation with two laser beams as used in the method of the present invention.

DESCRIPTION OF PREFERRED EMBODIMENTS

Heretofore, the isotopes of lithium, $^6$Li and $^7$Li, have been separated from each other mainly by utilizing the difference of masses. Because the isotope separation factor of lithium is small, the work of separation and enrichment have proved highly complicated.

In due consideration of this state of the prior art, the inventors made a study in search of a method capable of easily and economically effecting the separation and enrichment of the isotopes of lithium. They have consequently reached a discovery that the element "lithium" has strong absorption lines in the neighborhood of 6707.84 Å and 3232.61 Å and, therefore, its isotopes $^6$Li and $^7$Li can easily be separated from each other by utilizing isotope shifts occurring in the respective absorption lines. The present invention has been accomplished on the basis of this discovery.

Figure 1:
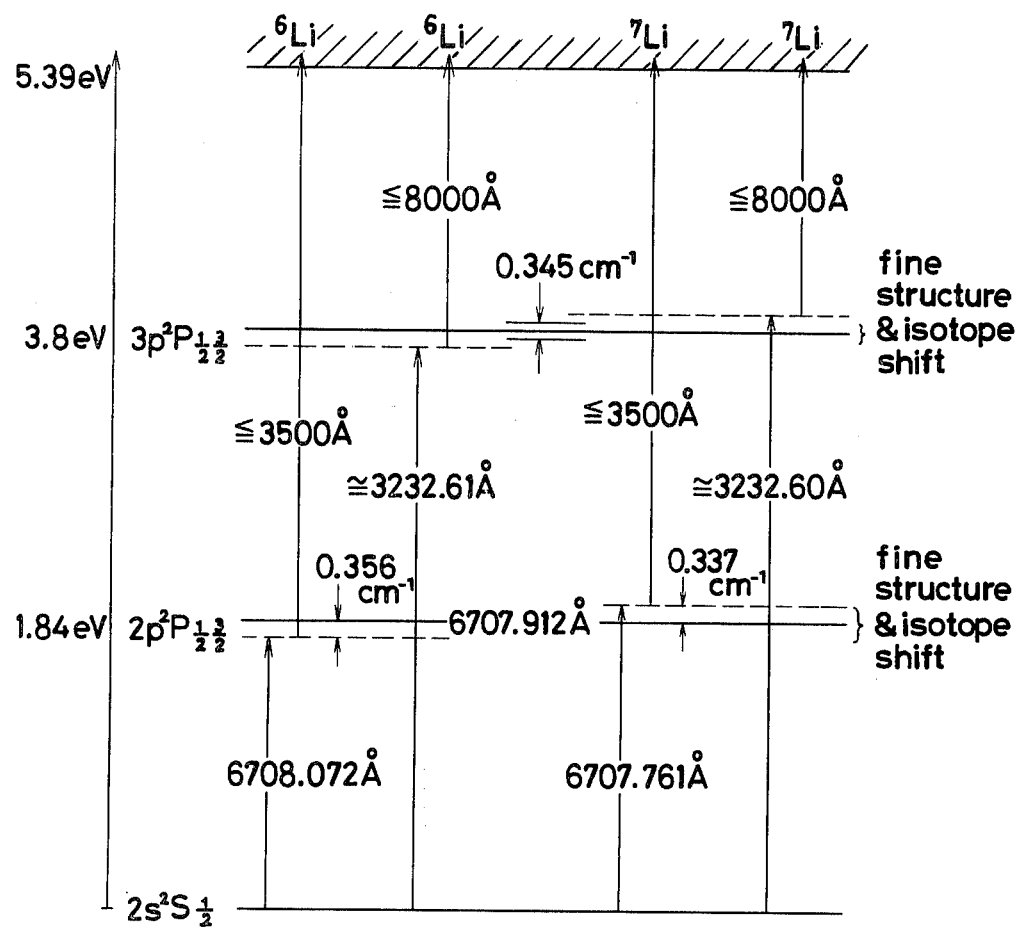
FIG. 1 is an explanatory diagram illustrating the energy level of lithium which is involved in the present invention.

FIG. 1 shows the energy level of lithium which is involved in the present invention.

The element "lithium" has two strong absorption lines, one in the neighborhood of 6708 Å and the other in the neighborhood of 3232 Å, and it involves an isotope shift of about 0.356 cm$^{-1}$ with respect to the former absorption lines and another isotope shift of about 0.345 cm$^{-1}$ with respect to the latter absorption lines. For example, when the isotopes of lithium are irradiated with a beam of light having a wavelength exactly tuned to either of a line due to only the desired isotope of the former absorption lines, the portions of $^6$Li and $^7$Li which have existed in the ground state 2s$^2$S$\frac{1}{2}$ are excited to the 2p$^2$P13/22 state. Similarly, when the isotopes of lithium are irradiated with a beam of light having a wavelength exactly tuned to either of a line due to only the desired isotope of the latter absorption lines, the portions of $^6$Li and $^7$Li which have existed in the ground state are excited to the 3p$^2$P13/22 state.

Figure 2:
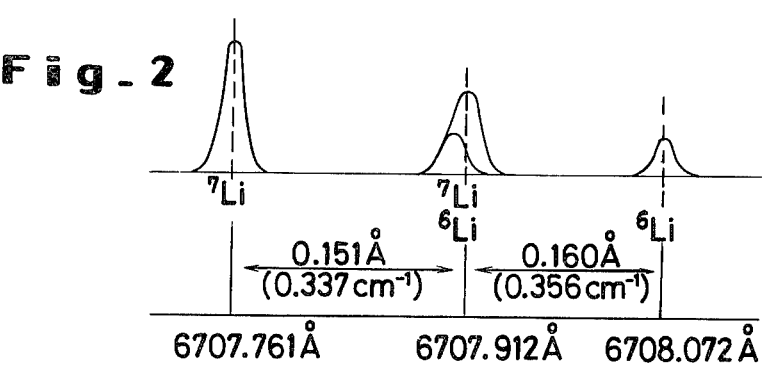
FIG. 2 is an explanatory diagram illustrating the isotope shifts of lithium in the neighborhood of 6708 Å.

To be more specific, when the isotopes of lithium are irradiated with a beam of laser light controlled to a wavelength in the range of from 6707.912 Å to 6708.072 Å by use of a laser capable of controlling the oscillating spectral width accurately to within 0.01 Å such as, for example, a dye laser which provides the oven containing vapor of only the undesired lithium isotope ($^7$Li) in the laser-cavity or provides some optical dispersion elements in the laser-cavity, only the $^6$Li of the isotopes of lithium is selectively excited. Similarly, irradiation of the isotopes of lithium with a beam of laser controlled to a wavelength in the range of from 6707.761 Å to 6707.912 Å results in selective excitation only the $^7$Li of the isotopes of lithium. (FIG. 2)

The only isotope which has thus been brought into the excited state is thereafter ionized by being irradiated with a light energy exceeding the ionization energy, i.e. a beam of laser of a wavelength of less than about 3500 Å. From the isotope which has escaped being ionized, the ionized isotope is readily separated by passing the mixture of the two isotopes through a mass-filter established in a magnetic field of a specific magnitude.

Where there is utilized the absorption line in the neighborhood of 3232.61 Å, a laser capable of controlling the oscillating spectral width accurately within 0.01 Å as described above is adjusted so as to generate a beam of laser having a wavelength capable of selectively exciting either $^6$Li or $^7$Li. Then, the isotopes of lithium are irradiated with this beam of laser. Thereafter they are irradiated with a beam of laser light of a wavelength of less than about 8000 Å to pump the selected isotope from the excited state to the ionized state. Consequently, the excited isotope in the mixed isotopes of lithium is selectively ionized. The ionized isotope is then separated and enriched by means of a mass-filter and an ion collector.

FIGS. 3 and 4 schematically represent one embodiment of the device to be used in practising the present invention. The outlets 2 formed in a tightly sealed chamber 1 are respectively connected to vacuum pumps (not shown), which are operated to maintain the interior of the chamber 1 in a state of vacuum of the level of 10$^{-7}$ mmHg.

Inside the chamber 1 is placed a heatproof crucible 3 such as a tantalum crucible. The crucible 3 holds metallic lithium 4 inside. The crucible 3 is provided on the outer wall thereof with heating element 17, which is covered externally with a heat seal material 5 for retention of heat.

In the path of the metallic lithium beam emanating from the outlet of the crucible, there are provided a thermal ion removing plate 6 and a vapor converging slit plate 7. At the outlet of the slit plate 7, a laser irradiation region 8 is provided. At the opposite extremities of the laser irradiation region 8, there are provided laser light sources 9, 10. (FIG. 4) The laser beams from the laser light sources 9, 10 are forwarded to the laser irradiation region 8 through laser beam converging lens or the Brewster angle windows 11 perpendicularly relative to the lithium beam.

Further, in the path of the lithium beam, there are provided ion lenses 12, quadripolar mass-filters 13, ion collecting electrodes 14, channel ion collectors 15 and a neutral atom trap 16.

In a device of the construction as described above, the interior of the chamber is evacuated to a vacuum degree of 10$^{-7}$ mmHg and the crucible 3 is heated to temperatures of from 500° to 800° C. with the heating element 17. Consequently, the metallic lithium 4 held inside the crucible 3 are melted and a continued flow of metallic lithium vapor issues from the outlet of crucible at a pressure of $10^{-2}$ to $10^0$ mmHg. The metallic lithium vapor issuing from the crucible 3 has $10^{14}$ to $10^{16}$ lithium atoms per cubic centimeter.

The current of metallic lithium beam spurted out of the crucible contains thermal ions, which are removed from the current by means of the thermal ion removing plate 6 which is disposed at the outlet of the crucible. Then, the beam is converged by the beam converging slit plate 7. The converged current of lithium beam is subsequently forwarded to the laser irradiation region 8, there to be irradiated with two beams of laser light 9', 10'. The laser irradiation region 8 is constantly irradiated by a light beam 9' issuing from the laser source 9 and controlled to excite the selected isotope and a light beam 10' issuing from the laser source 10 and controlled to ionize the isotope of lithium in the excited state. While the current of metallic lithium beam issuing from the slit plate 7 is passing through the laser irradiation region 8, the $^6Li$ or $^7Li$ contained in the atomic beam is instantaneously excited and ionized. The current of metallic lithium vapor now containing the ionized isotope is forwarded to the ion lenses 12, at which only the ionized isotope is collected so as to be effectively forwarded to the quadripolar mass-filters 13. At the mass-filters 13, the proportion of concentration of the ionized isotope is regulated by adjusting the intensity of the magnetic field formed therein. For example, highly concentrated $^6Li$ can be obtained by setting up the magnetic field at an intensity such as to permit passage of only the ionized $^6Li$. Thus, the lithium isotope concentrated to a desired proportion can easily be obtained by adjusting the intensity of the magnetic field of the mass-filter, and the concentrated lithium isotope is collected by the ion collecting electrodes 14. Finally, the collected isotope is neutralized and accumulated at the channel ion collector 15. In the meantime, the isotope which has escaped being ionized is allowed to advance in straight line and is accumulated at the neutral atom trap 16.

In the manner described above, the isotopes $^6Li$ and $^7Li$ of lithium are separated or enriched in a desired proportion.

The c.w. dye laser can be cited as a laser of the type which is capable of controlling the wavelength accurately to 6707.761 Å or to 6708.072 Å (i.e. to three places of decimals of Å). There are two methods for controlling the wavelength of the laser beam.

The first one is as follows.

In the enrichment or separation of $^6Li$, for example, if an oven containing only the $^7Li$ isotope is disposed inside the resonator of the laser unit and heated to a temperature between 300° C. and 500° C. to be filled with $^7Li$ vapor, and thereafter the isotopes of lithium to be separated are irradiated with a beam of laser light which has passed through the oven, then the spectral portion of the laser beam which has a wavelength for exciting $^7Li$ is absorbed by the $^7Li$ vapor inside the oven and only the isotope $^6Li$ is selectively excited. In the enrichment or separation of $^7Li$, when an oven containing $^6Li$ is disposed inside the resonator and heated, and thereafter the isotopes of lithium are irradiated with the beam of laser light which has passed through the oven, then only the isotope $^7Li$ is selectively excited.

On the other hand, a beam of laser having a desired oscillating spectral width can be also obtained by adjusting the dispersing elements such as prisms, birefringent filter and etalons which are provided inside the resonator of the laser unit.

Where the separation and enrichment is effected by utilizing the absorption line in the neighborhood of 3232.61 Å, the c.w. dye laser can effectively be used by having a non-linear optical crystal provided inside the resonator of the laser so as to generate the second harmonics wavelength.

For ionization of the excited lithium isotope, the excited isotope is irradiated with a beam of laser light having a wavelength of less than 3500 Å where the excitation has been effected by use of the absorption line in the neighborhood of 6707.84 Å. This irradiation is made with a beam of laser light having a wavelength of less than 8000 Å where the excitation has been effected by the absorption line in the neighborhood of 3232.61 Å. Upon exposure to the beam of laser light of the aforementioned description, the excited lithium isotope is pumped to a level exceeding that of ionizing energy. When a beam of laser light having a shorter wavelength than specified above is used for the purpose of ionization, then there is a possibility that the nonexcited lithium atom will additionally be ionized. Therefore, the lithium isotope excited selectively should be ionized by a laser beam having a longer wavelength than the wavelength corresponding to the photon energy which directly ionizes the lithium atom in the ground state.

Examples of lasers which are capable of generating such beams of laser light include the He-Cd laser and the Ne laser in the case of the 6708 Å selective excitation and the Ar ion laser and other similar visible lasers in the case of the 3233 Å selective excitation.

In the device shown in FIG. 4, the beam 9' of laser light used for selective excitation and the beam 10' of laser light used for ionization are projected to the laser irradiation region 8 in diametrically opposite directions. Alternately, the beam 9' of laser light for the selective excitation can be projected in a vertical direction and the beam 10' of laser light for the ionization in a horizontal direction so that they will intersect each other where the lithium atomic beam issues from the slit plate 7 as illustrated in FIG. 5.

According to the present invention, one of the two isotopes of lithium is excited and ionized by utilizing proper isotope shifts at the absorption lines of the element "lithium" so as to accomplish the separation and enrichment of the isotopes as described above. This invention, therefore, permits production of a lithium isotope concentrated to a higher purity in a shorter period of time than by any of the conventional methods for the enrichment and separation of lithium.

Further, the method of this invention obviates the necessity for repeating the process of separation in a plurality of steps. The equipment required for this method, therefore, is inexpensive. Thus, the enrichment and separation of lithium isotopes can be carried out economically by this invention.

Now, the present invention will be described more specifically with reference to working examples. This invention is not limited to the examples in any way.

EXAMPLE 1

In a device constructed as illustrated in FIG. 3, a tantalum crucible containing about 50 g of metallic lithium was placed within the chamber having the interior maintained at a vacuum degree of about $10^{-7}$ mmHg and was heated at about 730° C. At this time, the lithium vapor pressure inside the crucible was equivalent to about $7.5 \times 10^{-1}$ mmHg. The number of lithium atoms of the lithium atomic beam having been spurted out of the crucible was equivalent to $3 \times 10^{16}$ per cubic centimeter. Under this vapor pressure, the Doppler broadening of the absorption line in the neighborhood of 6707.84 Å was 0.026 cm$^{-1}$.

The lithium atomic beam thus generated within the crucible was passed through the thermal ion removing plate and the atomic beam converging slit plate having a slit of 1 mm $\times$ 10 mm. The number of lithium atoms of the lithium atomic beam issued from the slit was equivalent to $10^{18}$ per second. To the current of lithium atomic beam, a beam of laser light 6708.072 $\pm$ 0.025 Å in wavelength and 10 W/cm$^2$ in output strength produced by use of the c.w. dye laser (a mixed solution having sulforhodamine 101 and rhodamine 6G dissolved in ethylene glycol) provided with a resonator having therein two Brewster prisms, an etalon plates having a thickness of 0.3 mm and an etalon plate having a thickness of 2 mm was projected in the vertical direction and a beam of laser light 3250 Å in wavelength and $5 \times 10^3$ W/cm$^2$ in output length produced by use of a He-Cd laser was projected in the horizontal direction. The atomic beam which had been irradiated with the beams of laser lights was passed through a mass-filter set up in a magnetic field controlled so as to permit selective passage of only $^6$Li. Over a period of one hour, about 6.2 mg of $^6$Li concentrated to 50% was obtained.

The lithium atomic beam was irradiated with a beam of laser light from the c.w. dye laser provided an oven containing vapor of 99.9% $^7$Li in the resonator, in place of the above-mentioned beam of laser light for selective excitation. The beam of laser light had an output strength of 100 W/cm$^2$. Over a period of one hour irradiation, about 50 mg of $^6$Li concentrated to about 50% was obtained.

EXAMPLE 2

Under the same conditions as those of Example 1, lithium atomic beam was generated. To the current of lithium atomic beam coming out of the slit, a beam of laser light 3232.61 Å in wavelength, 0.17 cm$^{-1}$ in spectral width and 10 W/cm$^2$ in output strength produced by a c.w. dye laser (rhodamine B dissolved in ethylene glycol) having an ADP crystal inserted in the resonator of the laser for second harmonic generation was projected in the vertical direction for selective excitation and the beam of an Ar ion laser $7 \times 10^8$ W/cm$^2$ in intensity with the wavelength from 5145 Å to 4545 Å was projected in the horizontal direction for ionization.

After one hour of a exposure to these beams of lasers, the lithium vapor produced about 20 mg of $^6$Li concentrated to about 50%.

EXAMPLE 3

Under the same conditions as those of Example 1, lithium atomic beam was generated. To the current of lithium beam, a beam of laser light from the c.w. dye laser (a solution mixed with sulforhodamine 101 and rhodamine 6G dissolved in ethylene glycol) provided with a resonator having therein an oven filled with $^6$Li vapor so as to filter only the wavelength corresponding to $^6$Li atomic resonance line of the oscillating wavelengths around 6708 Å was projected in the vertical direction and a beam of laser light of 3250 Å in wavelength and $5 \times 10^3$ W/cm$^2$ in output strength produced by use of a He-Cd laser was projected in the horizontal direction. The lithium beam which had been exposed to the beams of laser lights was passed through a mass-filter set up in a magnetic field controlled to permit selective passage of $^7$Li. When the beam of laser light from the c.w. dye laser had an output strength of 10 W/cm$^2$, there was obtained about 60 mg of $^7$Li concentrated to about 99% over a period of one hour irradiation.

What is claimed is:

1. A method for the separation and enrichment of lithium isotopes by use of laser light comprising the steps of irradiating lithium atomic beam with a first beam of laser light having a wavelength capable of exciting selectively a first isotope of lithium and incapable of exciting a second isotope of lithium, causing the lithium atomic beam which underwent the irradiation with the first laser light to be irradiated with a second beam of laser light having a wavelength capable of ionizing the first isotope and incapable of ionizing the second isotope, and separating the ionized first isotope from the non-ionized second isotope by using a mass-filter.

2. The method according to claim 1, wherein the first isotope is $^6$Li and the first beam of laser light has a wavelength of 6708.072 Å and the second beam of laser light has a wavelength of less than 3500 Å.

3. The method according to claim 2, wherein the first beam of laser light has a wavelength of about 3232.61 Å and the second beam of laser light has a wavelength of less than 8000 Å.

4. The method according to claim 1, wherein the first isotope is $^7$Li, the first beam of laser light has a wavelength of 6707.761 Å and the second beam of laser light has a wavelength of less than 3500 Å.

5. The method according to claim 4, wherein the first beam of laser light has a wavelength of about 3232.60 Å and the second beam of laser light has a wavelength of less than 8000 Å.

6. The method according to claim 1, wherein the lithium atomic beam has a pressure in the range of from $10^{-2}$ to $10^0$ mmHg.

7. The method according to claim 1, wherein the oscillating wavelength of the first beam of laser light is controlled by inserting an oven filled with the vapor of only the second isotope of lithium in the laser-resonator and thereafter the lithium atomic beam is irradiated with the first laser beam so as to excite selectively only the first isotope of lithium.

* * * * *